United States Patent
Zimbrich et al.

(10) Patent No.: US 6,213,503 B1
(45) Date of Patent: Apr. 10, 2001

(54) MULTI-LEVEL OUTPUT AIR BAG INFLATOR

(75) Inventors: Robert C. Zimbrich; David A. Bilbrey, both of Knoxville; Charles D. Rodgers, Maryville; Andrew C. Kohl, Knoxville; Donald W. Renfroe, Knoxville; Richard K. Robbins, Knoxville; Todd S. Carlson, Knoxville, all of TN (US)

(73) Assignee: Atlantic Research Corporation, Gainesville, VA (US)

( * ) Notice: Subject to any disclaimer, the term of this patent is extended or adjusted under 35 U.S.C. 154(b) by 0 days.

(21) Appl. No.: 09/441,214

(22) Filed: Nov. 16, 1999

(51) Int. Cl.[7] .................................................. B60R 21/26
(52) U.S. Cl. .......................... 280/736; 280/741; 280/742
(58) Field of Search ................................... 280/741, 736, 280/742

(56) References Cited

U.S. PATENT DOCUMENTS 5,630,619 * 5/1997 Buchanan et al. .................... 280/741
5,794,973 * 8/1998 O'Loughlin et al. ................. 280/741

* cited by examiner

Primary Examiner—Eric Culbreth
(74) Attorney, Agent, or Firm—Nixon & Vanderhye PC; Frank P. Presta

(57) ABSTRACT

A multi-level output inflator for air bags or the like, comprising a center bulkhead, a primary gas generating unit connected at its inner end to one side of the bulkhead, and a secondary gas generating unit connected at its inner end to the opposite side of the bulkhead. The primary gas generating unit comprises a primary pressure vessel disposed adjacent to the bulkhead and in communication therewith, with an inert gas under pressure in the primary pressure vessel. The secondary gas generating unit comprises a secondary pressure vessel disposed adjacent to the bulkhead and in communication therewith, with an inert gas under pressure in the secondary pressure vessel. The bulkhead comprises a first opening therein in communication with the primary pressure vessel and a primary outlet port in communication with the first opening. A second opening is provided in the bulkhead with is in communication with the secondary pressure vessel and a secondary outlet port. A primary burst disc is disposed between the first opening of the bulkhead and the primary pressure vessel, and a secondary burst disc is provided between the second bulkhead opening and the secondary pressure vessel. Upon the ignition of the gas generating charge of one of the gas generating units, the gas therein is further pressurized to rupture the adjacent burst disc and effect the flow of the pressurized gas to the adjacent bulkhead opening and outlet port to the air bag for inflation thereof.

10 Claims, 3 Drawing Sheets

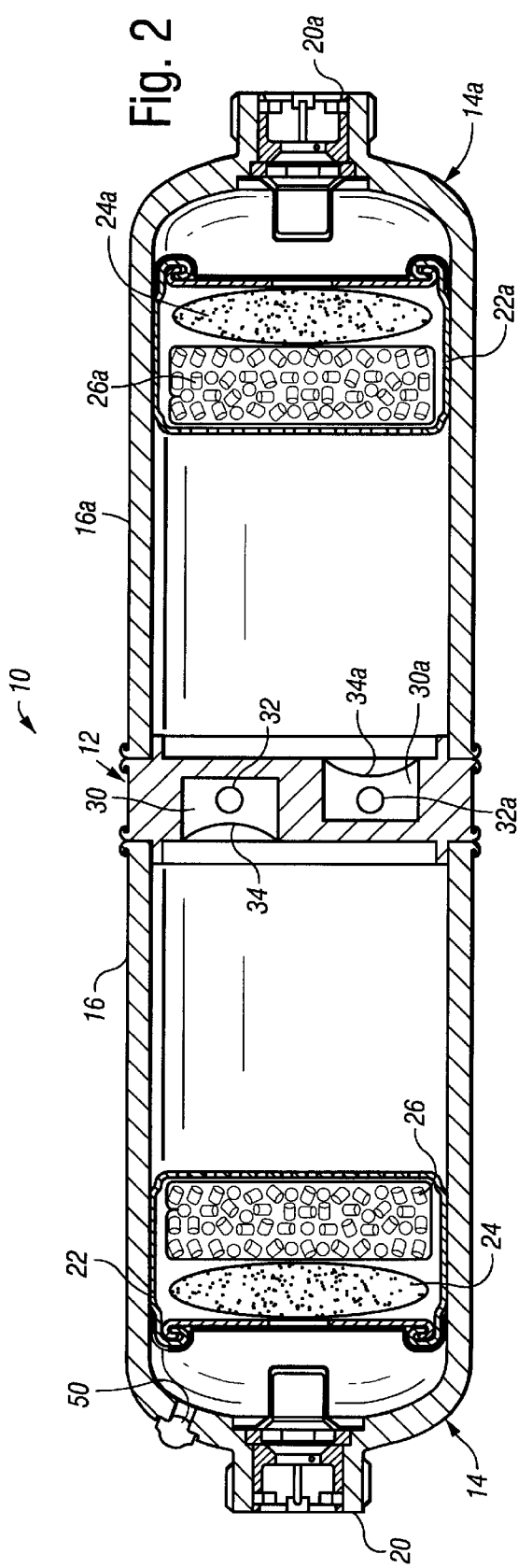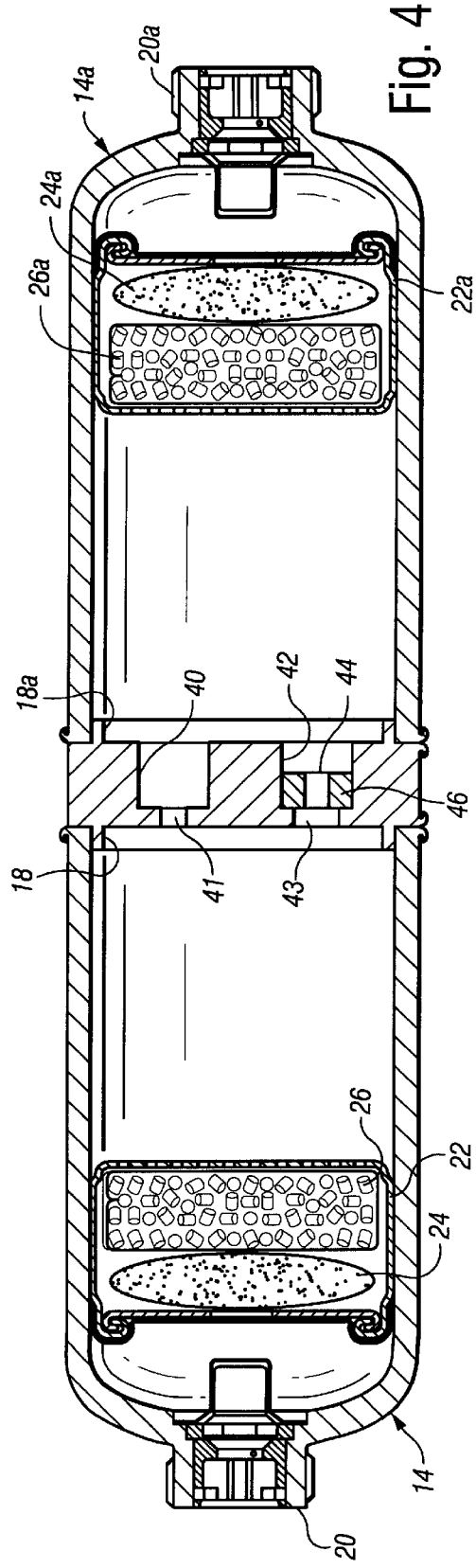

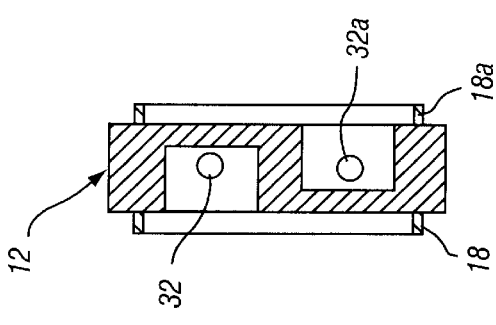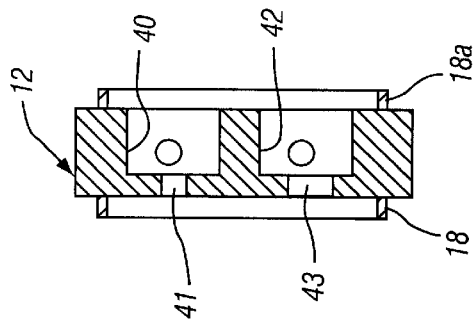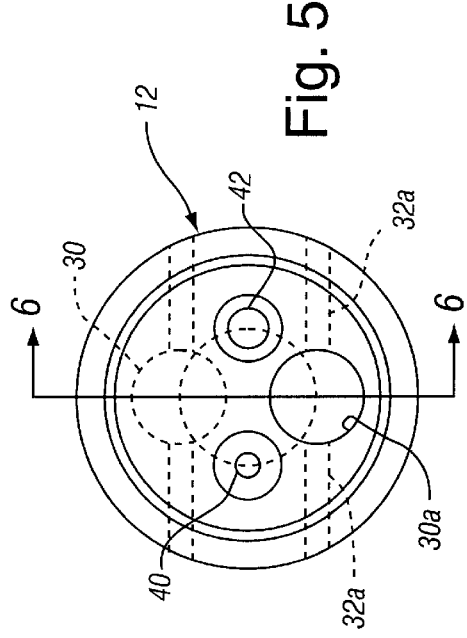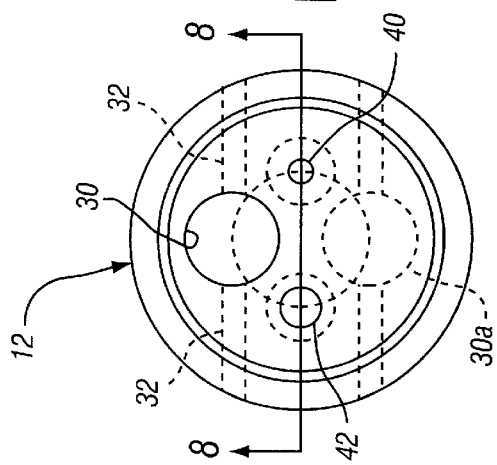

MULTI-LEVEL OUTPUT AIR BAG INFLATOR

BACKGROUND OF THE INVENTION

1. Field of the Invention

The present invention relates generally to an inflator device including gas generators and more specifically to a dual level inflator which can selectively release gas at different rates and levels and thus enable an air bag or the like type of inflatable safety restraining device, to be deployed at different output levels in accordance with different sensor inputs.

2. Description of the Related Art

Recently, there has been a demand for controlling the rate and amount of inflation of safety devices such as air-bag restraint systems, in accordance with variables such as passenger size, position, seat belt usage and the velocity of a vehicle at time of collision.

In order to provide optimal occupant protection, different levels of output are required from the air bag inflator. For example, in a high speed collision with a large unbelted person, full rapid inflation of the air bag is required to provide the best restraint. In lower speed crashes with smaller size occupants or even out-of-position occupants, a lower, slower rate of inflation is required so as not to inadvertently injure the occupant but still provide enough inflation to provide restraint.

In order to achieve the two levels of inflation, it has been proposed in U.S. Pat. No. 3,773,353 to Trowbridge et al. to provide two separate charges and to ignite one in the event that a slow inflation is required and to ignite both in the event of a high speed collision, thus achieving the very rapid inflation and deployment of the air bag which is necessary under such circumstances. In this device the charges are arranged within a reservoir which is filled with a non-toxic gas under pressure. This housing is sealed by a burst plate that is punched out by a piston and rod type of arrangement when a first of the two charges is detonated. This arrangement however, suffers from the drawback of being relatively complex and therefore, relatively expensive. For example, no less than three burst plate arrangements are necessary. Also, the charges are each isolated from the reservoir and reservoir gas by an inner housing and a respective rupturable closure.

U.S. Pat. No. 3,905,515 to Allemann discloses another two-stage inflator assembly which utilizes two separate charges and which disposes the charge in a chamber which is used to store a non-noxious gas under pressure. However, this arrangement is even more complex than that in U.S. Pat. No. 3,773,353. In this arrangement a portion of the burst disc forms the head of a slidable shuttle valve member which is projectable into an exhaust passage to partially throttle the outflow of gases following a detonation of one or both of the two charges.

Consequently, there is a need for a cost effective, lightweight, compact, simple multi-level inflator for air bags and the like.

SUMMARY OF THE INVENTION

It is an object of the present invention, therefore, to overcome the disadvantages of the prior art and to provide a cost effective yet safe multi-level inflator device which effectively permits multi-level performance.

A further object of the present invention is to provide a multi-level inflator with two gas generators, which permits ignition of the generators, either separately, simultaneously or in a timed sequence to effect air bag inflation at different rates in accordance with sensor inputs resulting from a crash or the like.

It is a further object of the present invention to provide a multi-level inflator of the hybrid type including a pair of gas generators with pressure vessels connected to opposite sides of a center bulkhead or the like having separate outlets for each pressure vessel.

It is an additional object of the present invention to provide a multi-level inflator wherein the separate outlets are thrust neutral and are provided with burst discs or the like.

A further object of the present invention is to provide a multi-level inflator wherein the energetics packages are located at the outer ends of the pressure vessels and can be separately ignited.

A still further object of the present invention is to provide such a multi-level inflator wherein the bulkhead has additional openings therein to selectively connect the pressure vessels.

Still another object of the present invention is to provide a multi-level inflator which is simple in construction and easy to assemble to minimize the cost and size of the assembly.

These and other objects of the present invention are achieved by providing multi-level inflation device for inflating a vehicle safety restraint such as an air bag comprising a central bulkhead or the like, and a pair of generally cylindrical hybrid-type gas generator units having the pressure vessel portions thereof connected to opposite sides of the bulkhead which has a pair of gas outlets in separate communication with the pressure vessels through burst discs or the like. The energetics portions of the gas generator units are located on the outer ends thereof. There are additional openings in the bulkhead which serve to connect the pressure vessels of the gas generator units when desired. In this manner, the gas generating units may be activated separately, simultaneously or in a desired sequence through the initiation of one or both of the gas generator units.

BRIEF DESCRIPTION OF THE DRAWINGS

FIG. 2 is a sectional view taken substantially along line 2—2 in FIG. 1;

FIG. 4 is a sectional view taken substantially along line 4—4 in FIG. 3;

FIG. 5 is an elevational view of one side of the bulkhead connecting the gas generating units;

FIG. 6 is a sectional view taken substantially along line 6—6 in FIG. 5;

FIG. 7 is an elevational view of the other side of the bulkhead; and

FIG. 8 is a sectional view taken substantially along line 8—8 in FIG. 7.

DESCRIPTION OF THE PREFERRED EMBODIMENTS

Figure 1:
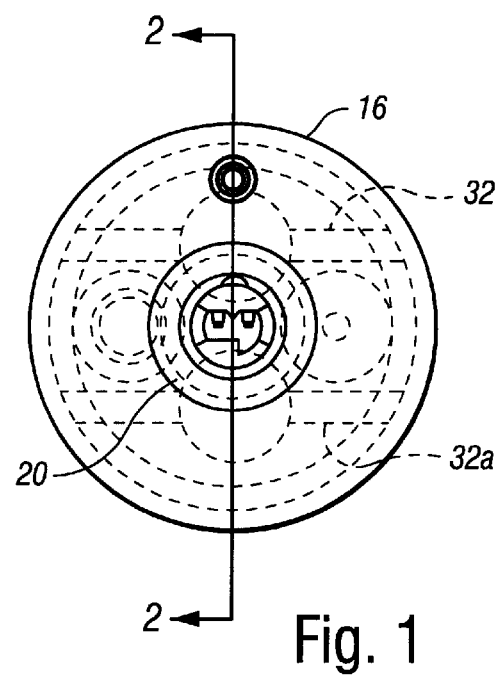
FIG. 1 is an end elevational view of the inflator of the present invention.
Figure 3:
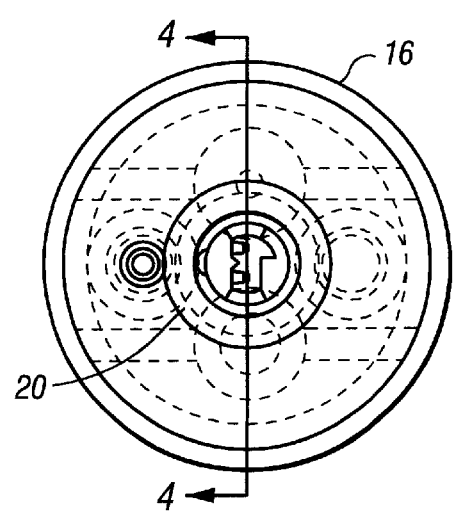
FIG. 3 is an end elevational view of the inflator in an orientation in which it is rotated approximately 90° from that in FIG. 1.

Referring to FIGS. 1–4, the inflator 10 of the present invention generally comprises a bulkhead 12 and a pair of gas generating units 14 and 14(a) of the hybrid type having pressure vessels 16 and 16a, respectively, secured to opposite sides of the bulkhead 12. As shown in FIGS. 2, 4, 6 and 8, the bulkhead 12 is provided with annular flanges 18 and 18a extending outwardly from the sides thereof on which the open ends of the pressure vessels 16 and 16a are mounted, respectively. Preferably, the bulkhead 12 and pressure vessels 16, 16a are formed of a lightweight metal and are secured together by friction welding or the like.

The primary gas generating unit 14 comprises at its outer closed end an initiator 20, a canister 22 having a booster charge 24 and a primary charge 26 therein, and an inert gas, such as argon and/or helium, under pressure within the pressure vessel 16.

Similarly, the secondary gas generating unit 14a comprises an initiator 20a at its outer closed end, a canister 22a containing a booster charge 24a and a secondary charge 26a, and an inert gas, such as argon and/or helium, under pressure within the pressure vessel 16a. The secondary gas generating unit 14a may be substantially the same in construction as the primary gas generating unit 14. The booster charges 24, 24a and the primary and secondary charges 26, 26a, may be of the same size and quantity or may be different.

In the operation of each gas generating unit 14, 14a, as is well known to those skilled in the art, a signal in response to a crash or the like fires the initiator 20, 20a to ignite the booster charge 24, 24a and then the primary charge 26 or secondary charge 26a to further pressurize the inert gas within the pressure vessel 16, 16a for the inflation of an air bag (not shown) operatively connected to the bulkhead 12.

As shown in FIGS. 2, 4 and 5–8, the bulkhead 12 comprises a first opening 30 in communication with laterally extending primary outlet ports 32 on both sides thereof. The first opening 30 faces the pressure vessel 16 of the gas generating unit 14 and is separated therefrom by a primary rupture or burst disc 34 (shown in FIG. 2).

The bulkhead 12 also comprises a second opening 30a which is in communication with laterally extending secondary outlet ports 32a on both sides thereof. The opening 30a faces the pressure vessel 16a of the gas generating unit 14a and is separated therefrom by a secondary rupture or burst disc 34a, as shown in FIG. 2. The outlet ports 32, 32a are thrust-neutral and are in communication with the air bag or other inflation device (not shown) to be inflated.

Accordingly, the primary gas generating unit 14 may be activated or fired to further pressurize the inert gas in the pressure vessel 16 which will cause the burst disc 34 to rupture so that pressurized gas enters the opening 30 and exits the primary outlet ports 32 to inflate the air bag. Similarly, the secondary gas generating unit 14a may be activated or fired to further pressurize the inert gas in the pressure vessel 16a to rupture the secondary burst disc 34a so that the pressurized gas enters the opening 30a in the bulkhead and exits the secondary outlet ports 32a to inflate the air bag. In accordance with the present invention, the gas generating units 14, 14a may be activated separately, simultaneously or in a timed sequence depending on the rate of inflation of the air bag that is desired in response to a crash or the like.

The bulkhead 12 further comprises bores or openings 40, 42 therethrough that are spaced from the openings 30, 30a and serve to connect the pressure vessel 16 of the primary gas generating unit 14 and the pressure vessel 16a of the secondary gas generating unit 14a. The bore 40 comprises a larger portion adjacent the secondary pressure vessel 16a and a small bleed hole 41 adjacent the primary pressure vessel 16. Similarly, the bore 42 has a larger bore portion adjacent the secondary pressure vessel 16a and a smaller bore portion 43 adjacent the primary pressure vessel 16. The smaller bore portion 43 of the bore 42 is larger than the bleed hole 41 of the bore 40 for a reason to be described hereinafter. As an illustrative example, the size of the bleed hole 41 may be approximately 0.016 inches in diameter, and the smaller bore portion 43 may be approximately 0.030 inches in diameter. It is noted that the bores 40, 42, bleed hole 41 and bore portion 43 may be of any desired relative size and shape depending on the output required.

As shown in FIG. 4, an orifice insert 44 is positioned within the bore 42 of the bulkhead 12 and comprises a burst disc 46 disposed adjacent the smaller bore portion 43 of the bore 42. The burst disc 46 preferably is constructed to rupture at a pressure less than that at which the secondary burst disc 34a will rupture. As an illustrative example, the burst disc 46 may be constructed to rupture at a pressure that is approximately 500 psi lower than that at which the secondary burst disc 34a will rupture.

For different applications burst disc 46 can be constructed to rupture at a pressure less than or greater than that at which the secondary burst disc 34a will rupture.

In the operation of the multi-level inflator 10 of the present invention, there are many options for the inflation of the air bag depending on the rate or level of inflation desired in response to the vehicle speed, position of the occupant and other factors at the time of the crash. For example, one option is to fire the primary gas generating unit 14 only and to use the pressurized gas therein for the inflation of the air bag. A second option is to fire both the primary and secondary gas generating units 14 and 14a simultaneously for the rapid inflation of the air bag through the primary and secondary outlet ports 32, 32a. A third option is to fire the primary gas generating unit 14 and the secondary gas generating unit 14a in a timed sequence for a desired gradual inflation rate of the air bag.

A fourth option is to fire the secondary gas generating unit 14a only. As the pressure builds up in the secondary pressure vessel 16a, it causes the burst disc 46 adjacent the smaller bore portion 43 to rupture. In this manner, the pressure then builds up in the secondary pressure vessel 16a to rupture the burst disc 34a and effect gas flow through the outlet ports 32a to the air bag. Because the hole in the orifice insert 44 is small, the gas flow rate from the primary pressure vessel 16 to the secondary pressure vessel 16a is reduced, thus causing the output flow through the secondary orifice 32a to be reduced. The primary gas generating unit would not be activated. This fourth option, therefore, results in a gradual inflation of the air bag initially, and then a stronger more rapid inflation thereafter.

The bleed hole 41 serves a dual purpose. It allows the secondary pressure vessel 16a to be filled with inert gas introduced into the primary pressure vessel 16 through the fill hole 50 at the outer end thereof. Also, when the primary gas generating unit 14 is fired to effect gas flow from the primary pressure vessel 16 to the outlet ports 32, the bleed hole 41 allows the pressurized gas in the secondary pressure vessel 16a to vent therethrough into the primary pressure vessel 16 so that there will be no gas under pressure remaining in the inflator 10 after it is operated.

It will be noted that the construction and operation of the subject multi-level output inflator are quite simple with a minimum of parts. This allows for a compact construction and ease of assembly. The only major parts are the center bulkhead 12 and the primary gas generating unit 14 and secondary gas generating unit 14a secured thereto. All of the outlet ports and connecting bores are located in the center bulkhead 12. This allows the subject inflator to be lighter in weight and with fewer parts than current inflators. Also, it eliminates the need for separate end closures by using those that are integral to the pressure vessels for the primary and secondary gas generating units.

The gas generating pressure vessels 16 and 16a may be essentially the same size thereby eliminating the need for a second set of form tools and assembly tools to provide a cost savings.

Similarly, the initiators 20 and 20a may be substantially identical to thereby eliminate the need for a second set of tools and assembly aids and thus provide a cost savings.

The energetics canisters 22 and 22a may be substantially identical to eliminate the need for a second set of tools and assembly aids and thus provide a cost savings.

What is claimed is:

1. A multi-level output inflator for an air bag, comprising:

a center bulkhead operatively connected to the air bag;

a primary gas generating unit having an inner end connected to one side of said bulkhead and comprising a primary pressure vessel disposed adjacent to said bulkhead and in communication therewith, said primary pressure vessel having an inert gas under pressure therein:

a secondary gas generating unit having an inner end connected to the opposite side of said bulkhead, and comprising a secondary pressure vessel disposed adjacent to said bulkhead and in communication therewith, said secondary pressure vessel having an inert gas under pressure therein;

said bulkhead comprising a first opening therein in communication with said primary pressure vessel and a primary outlet port in communication with said first opening and the air bag, a second opening therein in communication with said secondary pressure vessel and a secondary outlet port in communication with said second opening and the air bag, a primary burst disc between said first opening and said primary pressure vessel, and a secondary burst disc between said second opening and said secondary pressure vessel, each of said gas generating units comprising a closed outer end and an initiator and ignitable gas generating charge in communication with the pressure vessel thereof;

whereby upon the ignition of the gas generating charge of one of said gas generating units, the gas therein is further pressurized to rupture the adjacent burst disc and effect the flow of the pressurized gas through the adjacent bulkhead opening and outlet port to the air bag for inflation thereof;

said bulkhead further comprising a first bore extending therethrough that connects said primary and secondary pressure vessels, and a second bore therethrough which connects said primary and secondary pressure vessels and is of a size smaller than that of said first bore.

2. The inflator of claim 1 wherein said initiator and said gas generating charge are located near the outer end of each gas generating unit.

3. The inflator of claim 1 wherein a pair of primary outlet ports are positioned on opposite sides of said first opening of said bulkhead, and a pair of secondary outlet ports are located on opposite sides of said second opening of said bulkhead so as to be thrust-neutral when pressurized gas flows therethrough.

4. The inflator of claim 1 wherein said bulkhead comprises a primary annular flange extending laterally from one side thereof, and a secondary annular flange extending laterally from the opposite side thereof, said primary pressure vessel being mounted on said primary flange, and said secondary pressure vessel being mounted on said secondary flange.

5. The inflator of claim 1 wherein said first bulkhead opening is not in communication with said secondary pressure vessel, and said second bulkhead opening is not in communication with said primary pressure vessel.

6. The inflator of claim 1 wherein said second bore is a bleed hole.

7. The inflator of claim 1 wherein said bulkhead, said primary gas generating unit and said secondary gas generating unit are formed of metal and are connected by friction welds.

8. The inflator of claim 1 wherein said primary gas generating unit and said secondary gas generating unit are substantially the same in size and construction.

9. The inflator of claim 8 wherein said primary gas generating unit and said secondary gas generating unit are generally cylindrical in shape, and said bulkhead is generally circular in shape and of a diameter substantially the same as that of said primary and secondary gas generating units.

10. A multi-level output inflator for an air bag, comprising:

a center bulkhead operatively connected to the air bag;

a primary gas generating unit having an inner end connected to one side of said bulkhead and comprising a primary pressure vessel disposed adjacent to said bulkhead and in communication therewith, said primary pressure vessel having an inert gas under pressure therein:

a secondary gas generating unit having an inner end connected to the opposite side of said bulkhead, and comprising a secondary pressure vessel disposed adjacent to said bulkhead and in communication therewith, said secondary pressure vessel having an inert gas under pressure therein;

said bulkhead comprising a first opening therein in communication with said primary pressure vessel and a primary outlet port in communication with said first opening and the air bag, a second opening therein in communication with said secondary pressure vessel and a secondary outlet port in communication with said second opening and the air bag, a primary burst disc between said first opening and said primary pressure vessel, and a secondary burst disc between said second opening and said secondary pressure vessel, each of said gas generating units comprising a closed outer end and an initiator and ignitable gas generating charge in communication with the pressure vessel thereof;

whereby upon the ignition of the gas generating charge of one of said gas generating units, the gas therein is further pressurized to rupture the adjacent burst disc and effect the flow of the pressurized gas through the adjacent bulkhead opening and outlet port to the air bag for inflation thereof;

said bulkhead further comprising a first bore extending therethrough that connects said primary and secondary pressure vessels, said first bore having a burst disc therein between said first pressure vessel and said second pressure vessel, said first bore burst disc being constructed to rupture at a pressure less than that at which said primary burst disc and said secondary burst disc will rupture, whereby upon ignition of said secondary gas generating unit the increased pressure in said secondary pressure vessel causes said first bore burst disc to rupture to connect said primary and secondary pressure vessels and effect a slow flow of gas from said primary to said secondary pressure vessel, thereby resulting in a gradual initial inflation of the air bag when said secondary burst disc ruptures.

* * * * *